(12) United States Patent
Sriram et al.

(10) Patent No.: US 10,867,595 B2
(45) Date of Patent: Dec. 15, 2020

(54) COLD FUSING SEQUENCE-TO-SEQUENCE MODELS WITH LANGUAGE MODELS

(71) Applicant: Baidu USA, LLC, Sunnyvale, CA (US)

(72) Inventors: Anuroop Sriram, Sunnyvale, CA (US); Heewoo Jun, Sunnyvale, CA (US); Sanjeev Satheesh, Sunnyvale, CA (US); Adam Coates, Mountain View, CA (US)

(73) Assignee: Baidu USA LLC, Sunnyvale, CA (US)

( * ) Notice: Subject to any disclaimer, the term of this patent is extended or adjusted under 35 U.S.C. 154(b) by 145 days.

(21) Appl. No.: 15/913,875

(22) Filed: Mar. 6, 2018

(65) Prior Publication Data

US 2018/0336884 A1  Nov. 22, 2018

Related U.S. Application Data

(60) Provisional application No. 62/508,684, filed on May 19, 2017.

(51) Int. Cl.
| | | |
|---|---|---|
| *G10L 15/06* | (2013.01) | |
| *G06N 3/08* | (2006.01) | |
| *G10L 15/183* | (2013.01) | |
| *G06N 3/04* | (2006.01) | |
| *G10L 15/16* | (2006.01) | |

(52) U.S. Cl.
CPC .......... *G10L 15/063* (2013.01); *G06N 3/0445* (2013.01); *G06N 3/0454* (2013.01); *G06N 3/08* (2013.01); *G06N 3/088* (2013.01); *G10L 15/183* (2013.01); *G06N 3/0481* (2013.01); *G10L 15/16* (2013.01)

(58) Field of Classification Search
None
See application file for complete search history.

(56) References Cited

U.S. PATENT DOCUMENTS

| | | | | |
|---|---|---|---|---|
| 6,308,155 B1 * | 10/2001 | Kingsbury | .............. | G10L 15/02 704/231 |
| 6,912,499 B1 * | 6/2005 | Sabourin | ............... | G10L 15/063 704/243 |

(Continued)

OTHER PUBLICATIONS

Amodei et al.,"Deep speech 2: End-to-End speech recognition in English and Mandarin," arXiv preprint arXiv:1512.02595, 2015. (28 pgs).

(Continued)

*Primary Examiner* — Neeraj Sharma
(74) *Attorney, Agent, or Firm* — North Weber & Baugh LLP

(57) ABSTRACT

Described herein are systems and methods for generating natural language sentences with Sequence-to-sequence (Seq2Seq) models with attention. The Seq2Seq models may be implemented in applications, such as machine translation, image captioning, and speech recognition. Performance has further been improved by leveraging unlabeled data, often in the form of a language models. Disclosed herein are "Cold Fusion" architecture embodiments that leverage a pre-trained language model during training. The Seq2Seq models with Cold Fusion embodiments are able to better utilize language information enjoying faster convergence, better generalization, and almost complete transfer to a new domain while using less labeled training data.

20 Claims, 8 Drawing Sheets

(56) References Cited

U.S. PATENT DOCUMENTS

| | | | | |
|---|---|---|---|---|
| 9,786,270 | B2* | 10/2017 | Senior | G10L 15/063 |
| 9,830,315 | B1* | 11/2017 | Xiao | G06F 17/2785 |
| 10,115,393 | B1* | 10/2018 | Kumar | G06N 3/08 |
| 10,204,621 | B2* | 2/2019 | Cui | G10L 15/07 |
| 10,229,672 | B1* | 3/2019 | Rao | G10L 15/187 |
| 10,529,318 | B2* | 1/2020 | Kurata | G10L 15/063 |
| 2004/0210438 | A1* | 10/2004 | Gillick | G10L 15/005 704/254 |
| 2010/0318355 | A1* | 12/2010 | Li | G10L 15/063 704/244 |
| 2011/0238407 | A1* | 9/2011 | Kent | G06F 40/58 704/3 |
| 2015/0019214 | A1* | 1/2015 | Wang | G10L 15/34 704/232 |
| 2019/0096392 | A1* | 3/2019 | Hanazawa | G10L 15/07 |

OTHER PUBLICATIONS

Bahdanau et al.,"Neural machine translation by jointly learning to align and translate," arXiv preprint arXiv:1409.0473, 2016. (15 pgs).

Bahdanau et al.,"End-to-End Attention-Based large vocabulary speech recognition," arXiv preprint arXiv:1508.04395, 2016. (8 pgs).

Bengio et al.,"Scheduled Sampling for Sequence Prediction with Recurrent Neural Networks," arXiv preprint arXiv:1506.03099, 2015. (9 pgs).

Chan et al.,"Listen, Attend and Spell," arXiv preprint arXiv:1508.01211, 2015. (16 pgs).

Chorowski et al.,"Towards better decoding and language model integration in sequence to sequence models," arXiv preprint arXiv:1612.02695, 2016. (6 pgs).

Chorowski et al.,"Attention-Based Models for Speech Recognition," arXiv preprint arXiv: 1506.07503, 2015. (19 pgs).

Chung et al.,"Empirical evaluation of gated recurrent neural networks on sequence modeling," arXiv preprint arXiv:1412.3555, 2014. (9 pgs).

Gulcehre et al.,"On using monolingual corpora in neural machine translation," arXiv preprint arXiv:1503.03535, 2015. (9 pgs).

He et al.,"Deep Residual Learning for Image Recognition," arXiv preprint arXiv:1512.03385, 2015. (12 pgs).

Hochreiter et al.,"Long Short-Term Memory," Neural Computation, 9(8):1735-1780, 1997. (32 pgs).

Jozefowicz et al.,"Exploring the Limits of Language Modeling," arXiv preprint arXiv:1602.02410, 2016. (11pgs).

Kingma et al.,"Adam: A method for stochastic optimization," arXiv preprint arXiv:1412.6980, 2017. (15 pgs).

Mikolov et al.,"Statistical Language Models Based on Neural Networks," PhD thesis, Brno University of Technology, 2012. [Online], [Retrieved Oct. 30, 2019]. Retrieved from Internet <URL: https://www.fit.vutbr.cz/~imikolov/rnnlm/thesis.pdf>. (133 pgs).

Ramachandran et al.,"Unsupervised pretraining for sequence to sequence learning," arXiv preprint arXiv:1611.02683, 2016. (20 pgs).

Sennrich et al., "Improving neural machine translation models with monolingual data," arXiv preprint arXiv:1511.06709, 2016. (11 pgs).

Shazeer et al., "Outrageously large neural networks: The sparsely-gated mixture-of-experts layer," arXiv preprint arXiv:1701.06538, 2017. (19 pgs).

Sutskever et al.,"Sequence to sequence learning with neural networks," arXiv preprint arXiv: 1409.3215, 2014. (9 pgs).

Vinyals et al.,"A Neural Conversational Model," arXiv preprint arXiv:1506.05869, 2015. (8 pgs).

Wu et al.,"Google's neural machine translation system: Bridging the gap between human and machine translation," arXiv preprint arXiv:1609.08144, 2016. (23 pgs).

Yang et al.,"Words or Characters? fine-grained gating for reading comprehension," arXiv preprint arXiv:1611.01724, 2016. (10 pgs).

* cited by examiner

300

400

COLD FUSING SEQUENCE-TO-SEQUENCE MODELS WITH LANGUAGE MODELS

CROSS-REFERENCE TO RELATED APPLICATION

This application claims the priority benefit under 35 USC § 119(e) to U.S. Prov. Pat. App. Ser. No. 62/508,684, filed on 19 May 2017, entitled "Cold Fusion: Training Seq2seq Models Together With Language Model," and listing Anuroop Sriram, Heewoo Jun, and Sanjeev Satheesh as inventors. The aforementioned patent document is incorporated by reference herein in its entirety.

BACKGROUND

A. Technical Field

The present disclosure relates generally to systems and methods for computer learning that can provide improved computer performance, features, and uses.

B. Background

Sequence-to-sequence (Seq2Seq) models have been used on many sequence labeling problems including automatic speech recognition, neural machine translation, conversational modeling, etc. These models can translate a sequence from an input domain (e.g., audio) into a sequence in the label domain (e.g., the text corresponding to the audio).

Since language models do not need labeled data, they can be trained on billions or even trillions of tokens and learn a better model of the label space than any Seq2Seq model trained on a labeled corpus. Seq2Seq models are therefore often combined with a language model (LM) to improve generalization.

An algorithm integrating a Seq2Seq model with an LM may be called a "fusion" algorithm. A standard way to integrate language models, which may be referred to as "Shallow Fusion," is to linearly combine the score of the task-specific Seq2Seq model with that of an auxiliary language model to guide beam search. An improvement on this approach, called "Deep Fusion," that learns to fuse the hidden states of the Seq2Seq decoder and a neural language model with a gating mechanism, after the two models are trained independently. While these models have been shown to improve performance over the baseline, they have several limitations.

For example, while the Deep Fusion approach has been shown to improve performance over the baseline, it has several limitations. First, because the Seq2Seq model is trained to output complete label sequences without a language model, its decoder learns an implicit language model from the training labels, taking up a significant portion of the decoder capacity to learn redundant information. Second, the residual language model baked into the Seq2Seq decoder is biased towards the training labels of the parallel corpus. For example, if a Seq2Seq model fully trained on legal documents is later fused with a medical language model, the decoder still has an inherent tendency to follow the linguistic structure found in legal texts. Thus, in order to adapt to novel domains, at a minimum, Deep Fusion must first learn to discount the implicit knowledge of the language.

Accordingly, what is needed are systems and methods that overcome these limitations to better utilize language information, provide faster convergence and better generalization, and better allow for transfer to a new domain.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may not be to scale.

DETAILED DESCRIPTION OF EMBODIMENTS

Figure 1:
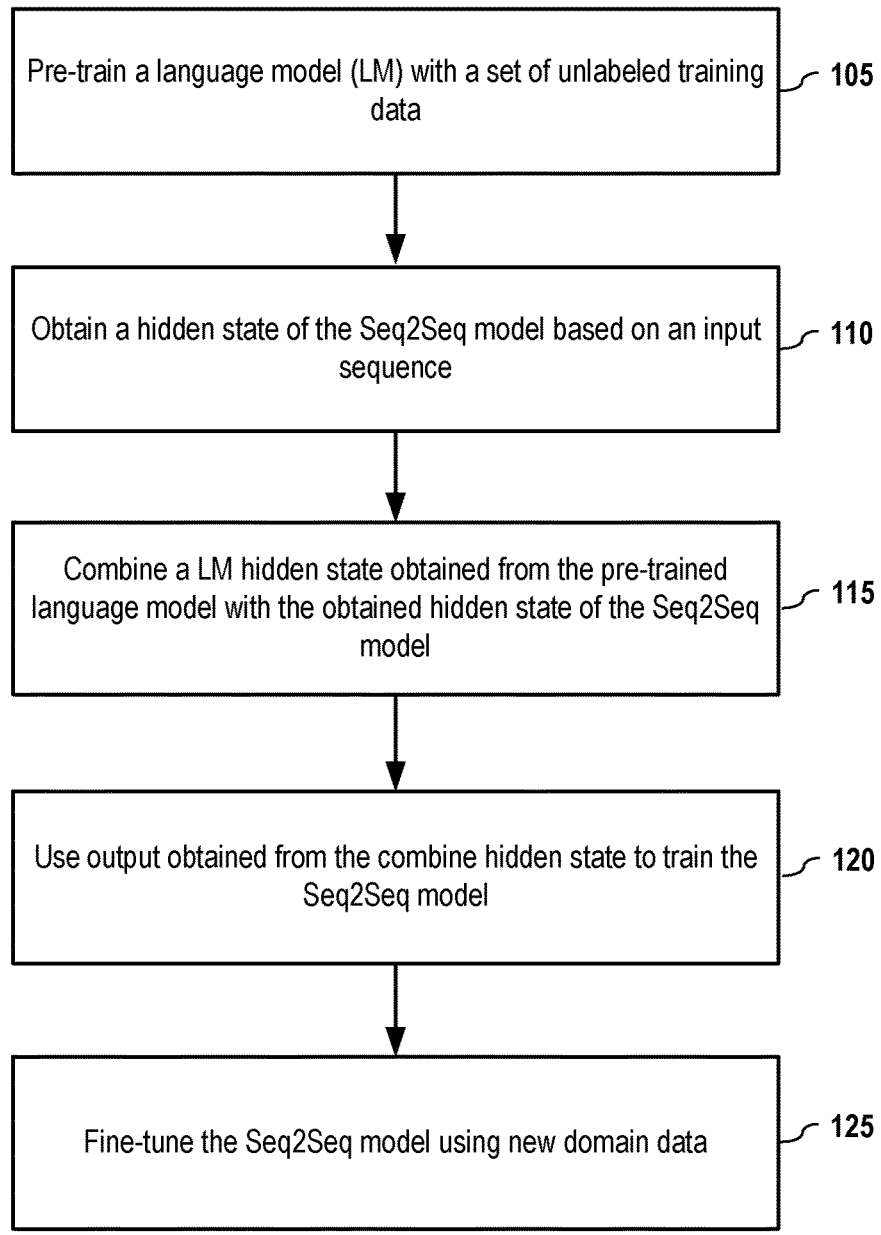
FIG. 1 depicts a "Cold Fusion" method to train a Seq2seq model together with a language model, according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each document/reference mentioned in this patent document is incorporate by reference herein in its entirety.

Furthermore, one skilled in the art shall recognize that: (1) certain steps may optionally be performed; (2) certain steps may not be limited to the specific order set forth herein; (3) certain steps may be performed in different orders; and (4) certain steps may be done concurrently.

A. Introduction

Sequence-to-sequence (Seq2Seq) models have been used on many sequence labeling problems including automatic speech recognition, neural machine translation, conversational modeling, and many more. These models learn to generate a variable-length sequence of tokens (e.g., texts) from a variable-length sequence of input data (e.g., speech or the same texts in another language). With a sufficiently large labeled dataset, a typical (or vanilla) Seq2Seq can model sequential mapping well, but it is often augmented with a language model to further help measure fluency of the generated text.

Because language models can be trained from abundantly available unsupervised text corpora which can have as many as one billion tokens, leveraging the rich linguistic information of the label domain can considerably improve Seq2Seq's performance. A standard way to integrate language models is to linearly combine the score of the task-specific Seq2Seq model with that of an auxiliary language model to guide beam search. A Deep Fusion algorithm (such as discussed in Gulcehre et al., "On Using Monolingual Corpora in Neural Machine Translation," arXiv preprint arXiv: 1503.03535, 2015) has been proposed to fuse the hidden states of the Seq2Seq decoder and a neural language model with a gating mechanism, after the two models are trained independently. As noted previously, this type of approach has limitations including: (1) its decoder learns an implicit language model, taking up a significant portion of the decoder capacity to learn redundant information; and (2) bias towards the training labels.

In this patent document, embodiments of new model approaches, which may be referred to generally herein as "Cold Fusion," are disclosed to overcome both these limitations. Cold Fusion embodiments encourage the Seq2Seq decoder to learn to use the external language model during training. In a Cold Fusion model embodiment, Seq2Seq may naturally leverage potentially limitless unsupervised text data, making it particularly proficient at adapting to a new domain. This is especially important in practice as the domain from which the model is trained can be different from the real-world use case for which it is deployed. In experiments, Cold Fusion embodiments are able to almost completely transfer to a new domain for the speech recognition task with 10 times less data. Additionally, in embodiments, the decoder only needs to learn task relevant information, and thus trains faster.

The patent document is organized as follows: Section B outlines some related work. Section C presents embodiments of Cold Fusion methods. Section D discloses some detailed experiments on the speech recognition task that demonstrate Cold Fusion's generalization and domain adaptation capabilities.

B. Related Work

1. Sequence-to Sequence Models

A basic Seq2Seq model comprises an encoder that maps an input sequence $x=(x_1, \ldots, x_T)$ into an intermediate representation h, and a decoder that in turn generates an output sequence $y=(y_1, \ldots, y_K)$ from h. The decoder may also attend to a certain part of the encoder states with an attention mechanism. The attention mechanism has been called hybrid attention, if it uses both the content and the previous context to compute the next context. It is soft if it computes the expectation over the encoder states as opposed to selecting a slice out of the encoder states.

For automatic speech recognition (ASR) task, a Seq2Seq model is called an acoustic model (AM) and maps a sequence of spectrogram features extracted from a speech signal to characters.

2. Inference and Language Model Integration

During inference, the most likely sequence $\hat{y}$ is computed as:

$$\hat{y} = \underset{y}{\operatorname{argmax}} \log p(y \mid x) \qquad (1)$$

Here, p(y|x) is the probability that the task-specific Seq2Seq model assigns to sequence y given input sequence x. The argmax operation is intractable in practice so a left-to-right beam search algorithm is used. In embodiments, a beam of K partial hypothesis is maintained starting with the start symbol $\langle s \rangle$. At each time-step, the beam may be extended by one additional character and only the top K hypotheses are kept. Decoding may continue until the stop symbol $\langle /s \rangle$ is emitted, at which point the hypothesis may be added to the set of completed hypotheses.

A standard way to integrate the language model with the Seq2Seq decoder is to change the inference task to:

$$\hat{y} = \underset{y}{\operatorname{argmax}} \log p(y \mid x) + \lambda \log p_{LM}(y), \qquad (2)$$

where $p_{LM}(y)$ is the language model probability assigned to the label sequence y. Chorowski & Jaitly ("Towards Better Decoding and Language Model Integration in Sequence To Sequence Models," arXiv preprint arXiv:1612.02695, 2016) and Wu et al. ("Google's neural machine translation system: Bridging the gap between human and machine translation," arXiv preprint arXiv:1609.08144, 2016) describe several heuristics that can be used to improve this basic algorithm. In this patent document, all of these methods are referred collectively as "*Shallow Fusion,*" since $p_{LM}$ is only used during inference.

Gulcehre et al. ("On Using Monolingual Corpora in Neural Machine Translation," arXiv preprint arXiv:1503.03535, 2015) proposed "*Deep Fusion*" for machine translation that tightens the connection between the decoder and the language model by combining their states with a parametric gating:

$$g_t = \sigma(v^T s_t^{LM} + b) \quad (3a)$$

$$s_t^{DF} = [s_t; g_t s_t^{LM}] \quad (3b)$$

$$y_t = \text{softmax}(DNN(s_t^{DF})) \quad (3c)$$

where $s_t$, $s_t^{LM}$, and $s_t^{DF}$ are the states of the task specific model, language model, and the overall deep fusion model. In Equation (3c), DNN may be a deep neural network with any number of layers. Function [a; b] is the concatenation of vectors a and b.

In Deep Fusion, the Seq2Seq model and the language model are first trained independently and later combined as in Equation (3). The parameters v and b are trained on a small amount of data keeping the rest of the model fixed, and allow the gate to decide how important each of the models are for the current time step.

One of the biggest disadvantages with Deep Fusion is that the task-specific model is trained independently from the language model. This means that the Seq2Seq decoder needs to learn a language model from the training data labels, which can be rather parsimonious compared to the large text corpora available for language model training. So, the fused output layer of (3) should learn to overcome this bias in order to incorporate the new language information. This also means that a considerable portion of the decoder capacity is wasted.

3. Semi-Supervised Learning in Seq2Seq Models

A few methods have been proposed for leveraging unlabeled text corpora in the target domain, for both better generalization and domain transfer.

Sennrich et al. ("Improving neural machine translation models with monolingual data", In Proceedings of the 54th Annual Meeting of the Association for Computational Linguistics, pp. 86-96, 2015) proposed backtranslation as a way of using unlabeled data for machine translation. Backtranslation improves the BLEU (bilingual evaluation understudy) score by increasing the parallel training corpus of the neural machine translation model by automatically translating the unlabeled target domain text. However, this technique does not apply well to other tasks where backtranslation is infeasible or of very low quality (like image captioning or speech recognition).

Ramachandran et al. ("Improving neural machine translation models with monolingual data", In Proceedings of the 54th Annual Meeting of the Association for Computational Linguistics, pp. 86-96, 2015) proposed warm starting the Seq2Seq model from language models trained on source and target domains separately. Unsupervised pre-training can show improvements in the BLEU scores. While this may be a promising approach, the method is potentially difficult to leverage for the transfer task since training on the parallel corpus could end up effectively erasing the knowledge of the language models.

Both backtranslation and unsupervised pre-training are simple methods that require no change in the architecture.

C. Embodiments of Cold Fusion

One of the biggest differences between the Cold Fusion approaches and other models, such as Deep Fusion, is that the Seq2Seq model in Cold Fusion embodiments is trained from scratch together with a fixed pre-trained language model.

In this section, a Cold Fusion method embodiment is briefly described. FIG. 1 depicts a Cold Fusion method to train a Seq2seq model together with language model, according to embodiments of the present disclosure. In embodiments, a language model (LM) is pre-trained (105) with a set of training data. A hidden state of the Seq2Seq model may be obtained (110) based on an input sequence to the Seq2Seq model. In embodiments, a language model hidden state obtained from the language model is combined (115) with the obtained hidden state from the Seq2Seq model to form a combined hidden state. In embodiments, the output obtained from the combined hidden state operating on labelled data is used to train (120) the Seq2Seq model, and also the combined hidden state. In embodiments, part of the Seq2Seq model with the combined hidden state may optionally be further fine-tuned (125) with new domain data. Details of fine-tuning are further described in section D.

Because the Seq2Seq model is aware of the language model throughout training, it learns to use the language model for language specific information and capture relevant information conducive to mapping from the source to the target sequence. This disentanglement can increase the effective capacity of the model significantly. This effect is demonstrated empirically in Section D where Cold Fusion model embodiments perform well even with a very small decoder.

Figure 2:
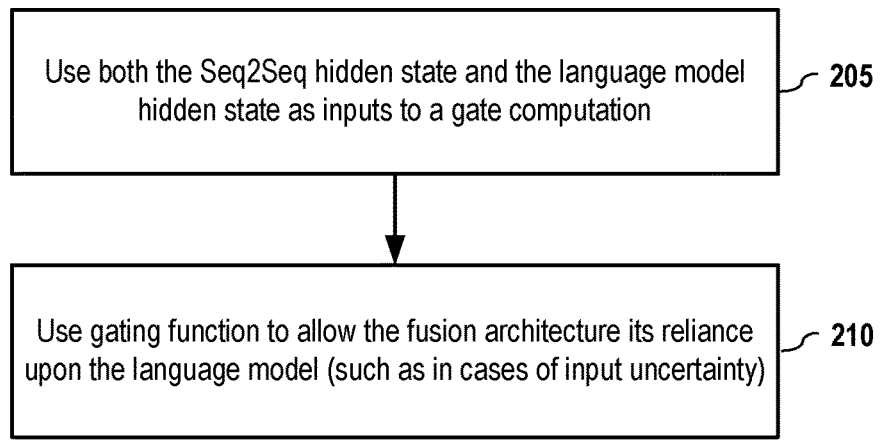
FIG. 2 depicts a method of using both Seq2Seq hidden state and the language model hidden state as inputs for gate computation, according to embodiments of the present disclosure.

One or more of the following improved modeling choices of the fusion mechanism may be employed in embodiments:

1. FIG. 2 depicts a method of using both Seq2Seq hidden state and the language model hidden state as inputs for gate computation, according to embodiments of the present disclosure. In embodiments, both the Seq2Seq hidden state $s_t$ and the language model hidden state $s_t^{LM}$ may be used as inputs (205) to a gate computation. The task-specific model's embedding contains information about the encoder states, which allows the fusion process to decide (210) its reliance on the language model, such as in case of input uncertainty. For example, when the input speech is noisy or a token unseen by the Seq2Seq model is presented, the fusion mechanism learns to pay more attention to the language model.

Figure 3:
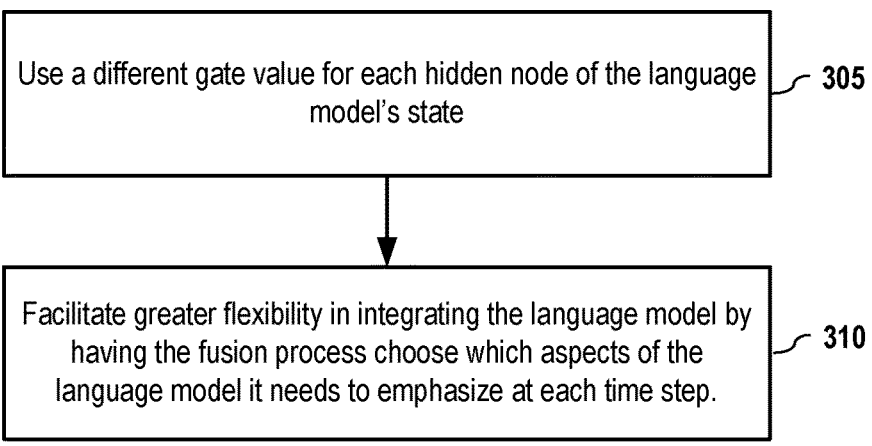
FIG. 3 depicts a method of using a fine-grained (FG) gating mechanism for Cold Fusion, according to embodiments of the present disclosure.

2. FIG. 3 depicts a method of using a fine-grained (FG) gating mechanism for Cold Fusion, according to embodiments of the present disclosure. FG gating mechanism, such as one discussed by Yang et al. in "Words or characters? Fine-Grained Gating for Reading Comprehension," (arXiv preprint arXiv:1611.01724 (2016)), may be employed. By using (305) a different gate value for each hidden node of the language model's state, greater flexibility is allowed in integrating the language model because the fusion algorithm may choose (310) which aspects of the language model it needs to emphasize more at each time step.

Figure 4:
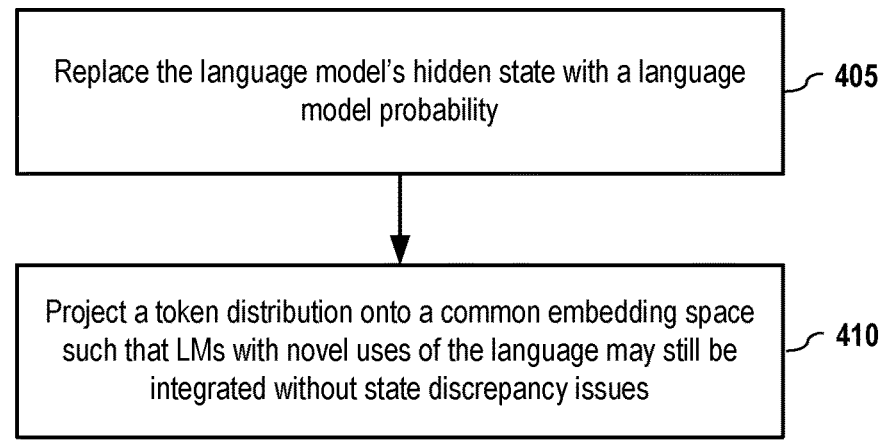
FIG. 4 depicts a method of using language model probability for Cold Fusion, according to embodiments of the present disclosure.

3. FIG. 4 depicts a method of using language model probability for Cold Fusion, according to embodiments of the present disclosure. In embodiments, the language model's hidden state is replaced (405) with the language model probability. The distribution and dynamics of $s_t^{LM}$ can vary considerably across different language models and data. As a concrete example, any fusion mechanism that uses the LM state is not invariant to the permutation of state hidden nodes. This limits the ability to generalize to new LMs. By projecting (410) the token distribution onto a common embedding space, LMs with novel uses of the language may still be integrated without state discrepancy issues. This also means that the Cold Fusion model embodiments may be trained with or swap on n-gram LMs during inference.

Embodiments of the Cold Fusion architecture (including methods of training) may works as follows:

$$h_t^{LM} = DNN(\ell_t^{LM}) \quad (4a)$$

$$g_t = \sigma(W[s_t; h_t^{LM}] + b) \quad (4b)$$

$$s_t^{CF} = [s_t; g_t \circ h_t^{LM}] \quad (4c)$$

$$r_t^{CF} = DNN(s_t^{CF}) \quad (4d)$$

$$\hat{P}(y_t | x, y_{<t}) = \text{softmax}(r_t^{CF}) \quad (4e)$$

$\ell_t^{LM}$ is the logit output of the language model, $s_t$ is the state of the task-specific model (e.g., the Seq2Seq model), b is bias, and $s_t^{CF}$ is the final fused state used to generate the output. Since logits can have arbitrary offsets, in embodiments, the maximum value is subtracted before feeding into the layer. Function 0 in equation (4c) is an element-wise multiplication between vectors. In equations (4a) and (4d), the DNN may be a deep neural network with any number of layers. In equation (4b), both Seq2Seq hidden state $s_t$ and the language model hidden state $h_t^{LM}$ are used as inputs for gate computation. During experiments, it was found that a single affine layer (a fully-connected layer in a Neural Network), with ReLU (Rectified Linear Unit) activation prior to softmax, is beneficial.

Figure 5:
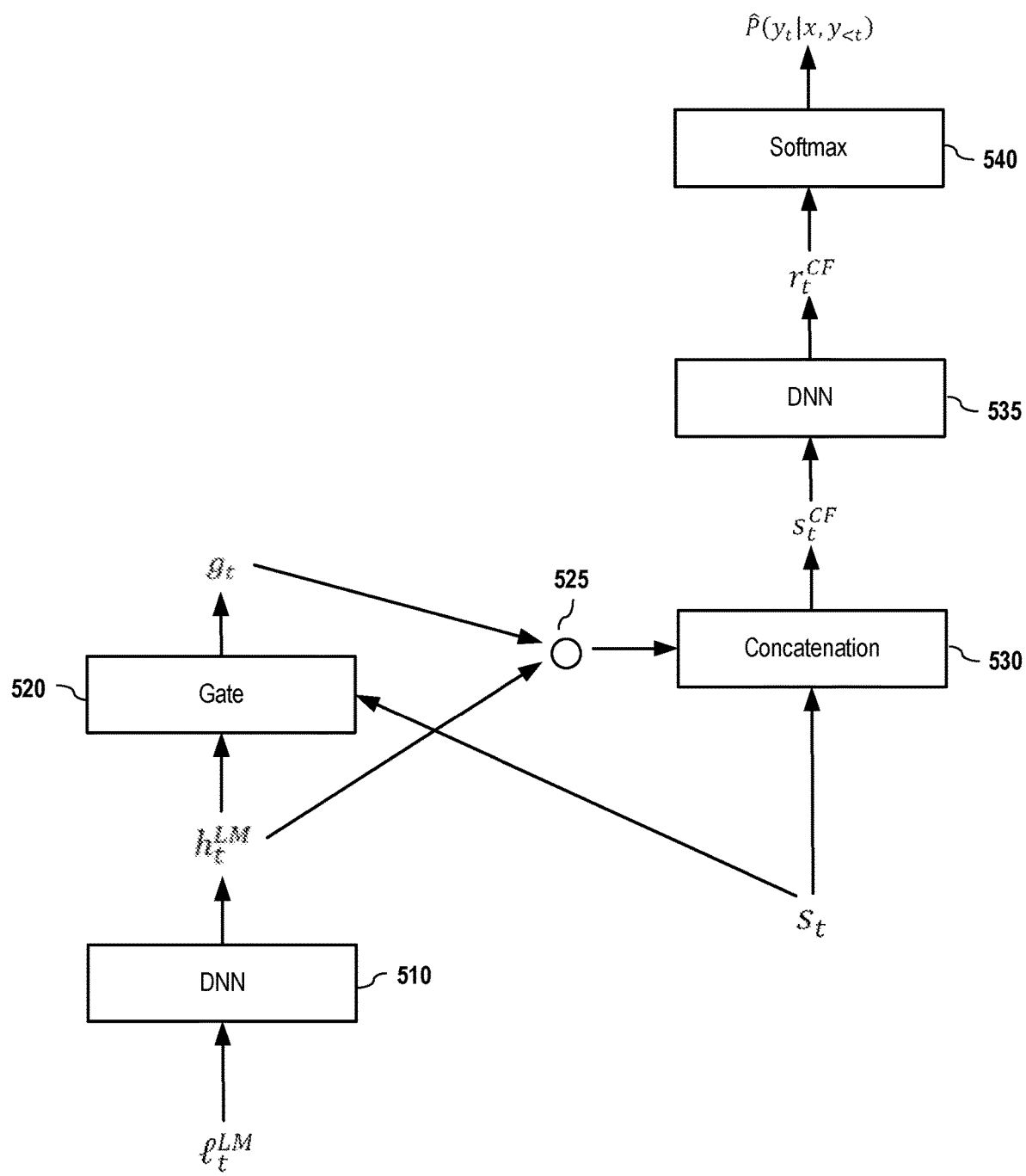
FIG. 5 depicts a cold fusion mechanism, according to embodiments of the present disclosure.

FIG. 5 depicts a cold fusion mechanism 500 with respect to equations (4a)-(4e), according to embodiments of the present disclosure. In embodiment, the logit output of the language model $\ell_t^{LM}$ is fed to a first DNN 510 to generate hidden state $h_t^{LM}$ of the language model, such as transformation of $\ell_t^{LM}$ into $h_t^{LM}$ may be referred as "probability projection" in this disclosure. Both a Seq2Seq model's hidden state $s_t$ and the language model's hidden state $h_t^{LM}$ are used as inputs to a gate 520 for gate computation. An element-wise multiplication 525 is implemented between the gate computation result $g_t$ and the hidden state $h_t^{LM}$. The multiplication result and the Seq2Seq hidden state $s_t$ are concatenated 530 to generate the final fused state $s_t^{CF}$, which is fed into a second DNN 535 to generate a logit output $r_t^{CF}$ based on the fused states. Another DNN 535 functions to learn mapping from the fused hidden states to the output distribution. The logit output $r_t^{CF}$ is eventually fed into a softmax layer 540 for the generation of a probability over outputs for model training, $\hat{P}(y_t | x, y_{<t})$.

D. Various Experiments

It shall be noted that these experiments and results provided in this patent document are provided by way of illustration and were performed under specific conditions using a specific embodiment or embodiments; accordingly, neither these experiments nor their results shall be used to limit the scope of the disclosure of the current patent document.

1. Setup

Embodiments of the Cold Fusion methodology were tested on the speech recognition tasks with various experiments. The results were compared using the character error rate (CER) and word error rate (WER) on the evaluation sets. For all models which were trained on the source domain, the source CER and WER indicate in-domain performance and the target CER and WER indicate out-of-domain performance.

In embodiments, two data sets were collected: one based on search queries which served as the source domain, and another based on movie transcripts which served as the target domain. For each dataset, Amazon Mechanical Turk was used to collect audio recordings of speakers reading out the text. Identical instructions were given to all the turkers in order to ensure that the two datasets only differed in the text domain. The source dataset contains 411,000 utterances (about 650 hours of audio), and the target dataset contains 345,000 utterances (about 676 hours of audio). 2048 utterances from each domain were used for evaluation.

The text of the two datasets differ significantly. Table 1 shows results of training character-based recurrent neural network language models on each of the datasets and evaluating on both datasets. Language models very easily overfit the training distribution, so models trained on one corpus will perform poorly on a different distribution. It can be seen from Table 1 that models optimized for the source domain have worse perplexity on the target distribution.

TABLE 1

Dev set perplexities for character RNN language models trained on different datasets on source and target domain. Note that: i) the model trained on source domain does poorly on target domain and vice-versa indicating that the two domains are very different, and ii) the best model on both domains is a larger model trained on a superset of both corpuses. The model trained on the full dataset (which contains the source and target datasets along with some additional text) was used for all of the LM integration experiments.

| Model | Domain | Word Count | Perplexity Source | Perplexity Target |
| --- | --- | --- | --- | --- |
| GRU (3 × 512) | Source | 5.73M | 2.670 | 4.463 |
| GRU (3 × 512) | Target | 5.46M | 3.717 | 2.794 |
| GRU (3 × 1024) | Full | 25.16M | 2.491 | 2.325 |

2. Embodiments of Neural Network Architectures

The language model described in the final row of Table 1 was trained with about 25 million words. In embodiments, this model contains three layers of gated recurrent units (GRU) with a hidden state dimension of 1024. The model was trained to minimize the cross-entropy of predicting the next character given the previous characters. Adam optimizer was used with a batch size of 512. The model gets a perplexity of 2.49 on the source data and 2.325 on the target data.

Figure 6:
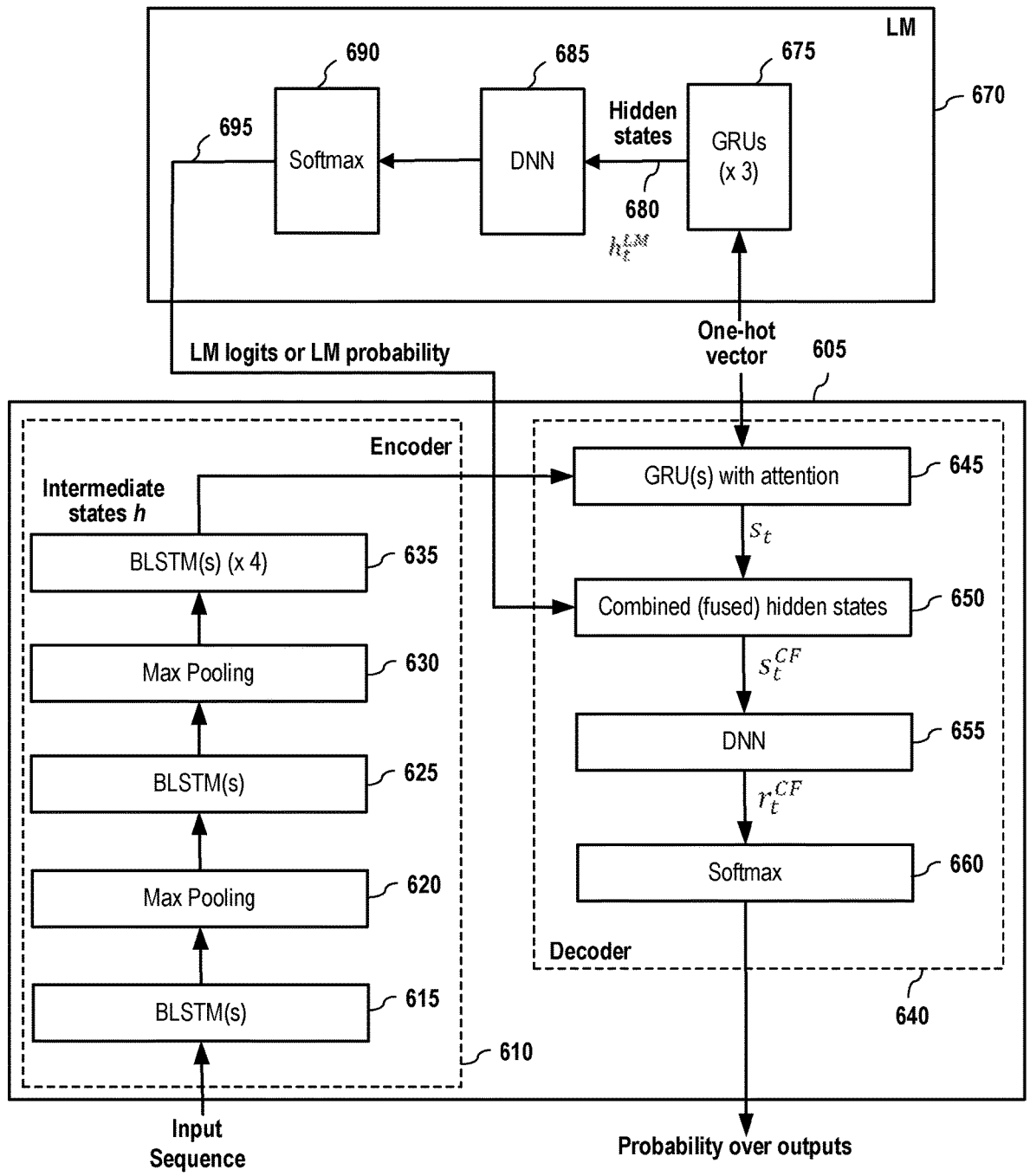
FIG. 6 depicts an exemplary Seq2Seq architecture with Cold Fusion, according to embodiments of the present disclosure.

FIG. 6 depicts an exemplary Seq2Seq architecture 600 with Cold Fusion according to embodiments of the present disclosure. The architecture 600 comprises a Seq2Seq model 605 and a language model 670, which is pre-trained with unlabeled training data. The Seq2Seq model 605 comprises an encoder 610 and a decoder 640. The encoder 610 receives input sequence and outputs intermediate representation to the decoder 640. In embodiments, the encoder 610 comprises one or more recurrent layers (615, 625, and 635). The one or more recurrent layers may be long short-term memory (LSTM) layers. In embodiments, the LSTM layers may be bidirectional LSTM (BLSTM) layers. In embodiments, the encoder 610 further comprises at least one max pooling layer (620 and 630) coupled between the BLSTMs. The max pooling layer combines multiple (such as two) time frames into one frame and takes the max points of each frame. In embodiments, the decoder 640 comprises at least one recurrent layer (such as GRU layer) 645 with attention. The at least one GRU layer 615 receives the intermediate representation and outputs hidden states 620 (corresponding to $s_t$ in equation 4).

In embodiments, the language model (LM) 670 is a RNN model comprising one or more gated recurrent units (GRUs) 675, a DNN 685 and a softmax 690 for the generation of the probability over outputs. In embodiments, the GRUs 675 is pre-trained with "unlabeled training data" to set GRU parameters, when the fused architecture is trained or deployed for production. The GRUs 675 output hidden states $h_t^{LM}$ 680 of the language model to the DNN 685 and the softmax 690, which outputs LM logits or LM probability 695 to the Seq2Seq model 605, such that the output from the LM 670 and the hidden states $s_t$ may be combined into combined hidden states 650. Various combination methods or algorithms may be implemented during the combination process, such as the embodiments shown in equation (4) and FIG. 5. The combined hidden states are used for further processing. In embodiments, the decoder 640 further comprises a deep neural network (DNN) 655, and a softmax 660 to further process the combined hidden states for the generation of the probability over outputs. In embodiments, the DNN 655 comprises an affine layer prior to softmax.

In embodiments, the Seq2Seq model is fused with the language model in various ways. In one embodiment, LM logits output from the LM model 670 is fused with the Seq2Seq model into combined hidden states in block 650, which comprises process of blocks 510, 520, 525 and 530 shown in FIG. 5. Such a fusion mechanism may be referred as "LM logit fusion". In another embodiment, LM states output from the LM model 670 are fused with the Seq2Seq model into combined hidden states in block 650. Such a fusion mechanism may be referred as "LM state fusion", wherein the LM hidden states 680 are directly used for fusion in block 650, which comprises process in blocks 520, 525 and 530 only.

In embodiments, for the acoustic models, Seq2Seq architecture with soft attention was used. The encoder consists of 6 bidirectional LSTM (BLSTM) layers each with a dimension of 480. In embodiments, max pooling layers was also used with a stride of 2 along the time dimension after the first two BLSTM layers, and residual connections (disclosed by He et al., "Deep Residual Learning for Image Recognition", arXiv preprint arXiv:1512.03385, 2015) were added for each of the BLSTM layers to help speed up the training process. The decoder consisted of a single layer of 960 dimensional Gated Recurrent Unit (GRU) with a hybrid attention (disclosed by Chorowski, et al., "Attention-Based Models For Speech Recognition," in Advances in Neural Information Processing Systems, pp. 577-585, (2015)).

In embodiments, the final Cold Fusion mechanism had one dense layer of 256 units followed by ReLU before softmax.

3. Embodiments of Training

In embodiments, the input sequence comprised 40 mel-scale filter bank features. The datasets were expanded with noise augmentation; a random background noise is added with a 40% probability at a uniform random SNR between 0 and 15 dB. Besides noise augmentation, no other form of regularization was used.

In embodiments, the entire system was trained end-to-end with Adam with a batch size of 64. The learning rates were tuned separately for each model using random search. To stabilize training early on, the training examples were sorted by increasing input sequence length in the first epoch. During inference, beam search with a fixed beam size of 128 was used for all of the experiments.

Scheduled sampling was also used with a sampling rate of 0.2 which was kept fixed throughout training. Scheduled sampling helped reduce the effect of exposure bias due to the difference in the training and inference mechanisms.

4. Embodiments of Improved Generalization

Leveraging a language model that has a better perplexity on the distribution of interest should directly mean an improved WER for the ASR task. In this section, different fusion methods are compared in achieving this effect.

Swapping the language model is not possible with Deep Fusion because of the state discrepancy issue motivated in Section C. All fusion models were therefore trained and evaluated with the same language model that achieved a low perplexity on both the source and target domains (See Table 1). In this way, improvements in transfer capability over Deep Fusion due to the training and architectural changes can be measured.

Table 2 compares the performance of Deep Fusion and Cold Fusion embodiments on the source and target held-out sets. Clearly, Cold Fusion consistently outperforms on both metrics on both domains than the baselines. For the task of predicting in-domain, the baseline model gets a word error of 14.68%, while the best Cold Fusion model gets a relative improvement of more than 21% over that number. Even compared to Deep Fusion model, the best Cold Fusion model gets a relative improvement of 15%.

Even bigger improvements were obtained in out-of-domain results. The baseline attention model, when trained on the source domain but evaluated on the target domain gets, 43.5% WER. This is significantly worse than the 17.6% that can be obtained by training the same model on the target dataset. The goal of domain adaptation is to bridge the gap between these numbers. The final column in Table 2 shows the remaining gap as a fraction of the difference for each model.

TABLE 2

Speech recognition results for various models discussed in this document

| Model | Train Domain | Test on source | | Test on Target | | |
| --- | --- | --- | --- | --- | --- | --- |
| | | CER | WER | CER | WER | Domain Gap |
| Baseline Attention Model | Source | 7.54% | 14.68% | 23.02% | 43.52% | 100% |
| Baseline Attention Model | Target | | | 8.84% | 17.61% | 0% |

TABLE 2-continued

Speech recognition results for various models discussed in this document

| Model | Train Domain | Test on source | | Test on Target | | Domain Gap |
|---|---|---|---|---|---|---|
| | | CER | WER | CER | WER | |
| Baseline + Deep Fusion | Source | 7.64% | 13.92% | 22.14% | 37.45% | 76.57% |
| + $s^{AM}$ in gate | Source | 7.61% | 13.92% | 21.07% | 37.9% | 78.31% |
| + Fine-Grained Gating | Source | 7.47% | 13.61% | 21.29% | 36.69% | 73.64% |
| + ReLU layer | Source | 7.50% | 13.54% | 21.18% | 38.00% | 78.70% |
| Baseline + Cold Fusion | | | | | | |
| + $s^{AM}$ in gate | Source | 7.25% | 13.88% | 15.63% | 30.71% | 50.56% |
| + Fine-Grained Gating | Source | 6.14% | 12.08% | 14.79% | 30.00% | 47.82% |
| + ReLU layer | Source | 5.82% | 11.52% | 14.89% | 30.15% | 48.40% |
| + Probability Projection | Source | 5.94% | 11.87% | 13.72% | 27.50% | 38.17% |

The Deep Fusion models can only narrow the domain gap to 76.57% while Cold Fusion method embodiments can reduce it to 38.17%. The same table also shows the incremental effects of the three architectural changes that have been made to the Cold Fusion method embodiments. Note that apply the same changes to the Deep Fusion method does not yield much improvements, indicating the benefits of cold starting Seq2Seq training with language models. In embodiments, the use of probability projection instead of the language model state in the fusion layer substantially helps with generalization. Intuitively, the character probability space shares the same structure across different language models unlike the hidden state space.

5. Embodiments related to Decoder Efficiency

Test has been implemented regarding whether cold fusion indeed relieves the decoder of learning a language model. The test was done by checking how a decrease in the decoder capacity affected the error rates. As evidenced in Table 3, the performance of the Cold Fusion models degrades gradually as the decoder cell size is decreased whereas the performance of the attention models deteriorates abruptly beyond a point. It is remarkable that the Cold Fusion decoder still outperforms the full attentional decoder with 4× fewer number of parameters.

Figure 7:
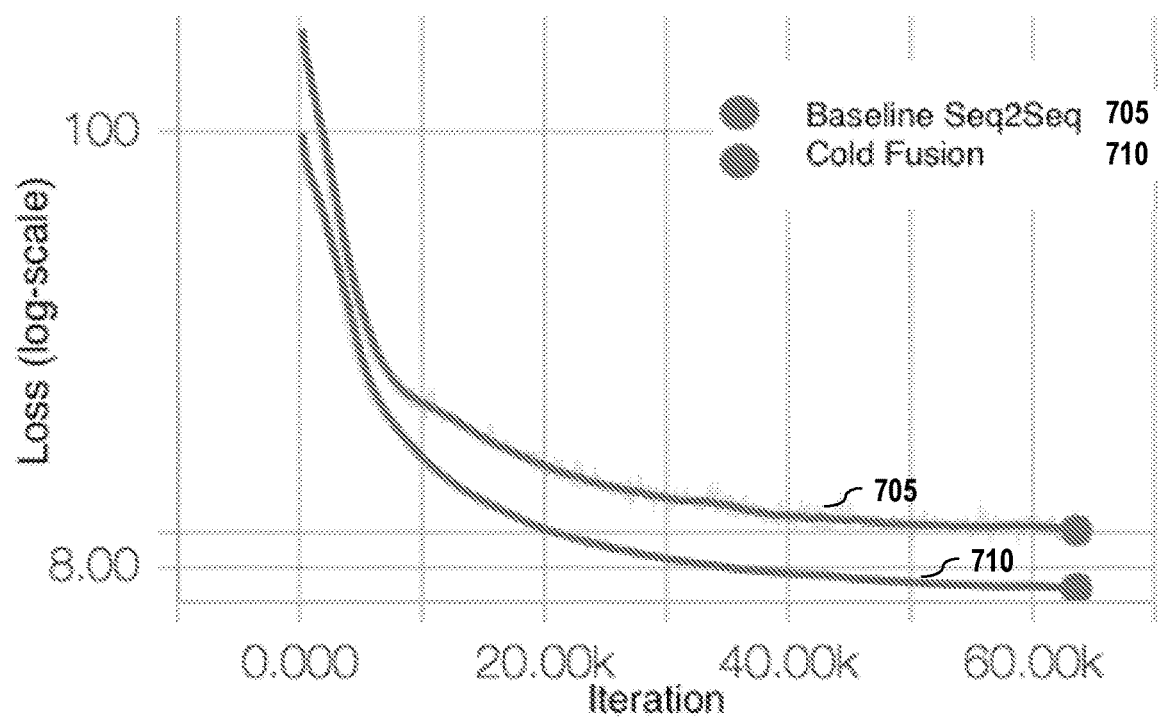
FIG. 7 depicts cross-entropy loss on the dev set for the baseline model and a cold fusion model as a function of training iteration, according to embodiments of the present disclosure.

Also, it was found that training is accelerated by a factor of 3 (see FIG. 7). In FIG. 7, cross-entropy loss on the dev set for the baseline Seq2Seq model and Cold Fusion model as a function of training iteration are represented as line 705 and line 710. Respectively. The Attention models typically may need hundreds of thousands of iterations to converge. Most of the training time is spent in learning the attention mechanism. One can observe this behavior by plotting the attention context over time and seeing that the diagonal alignment pattern emerges in later iterations. Because the pre-trained, fixed language model infuses the model with lower level language features like the likely spelling of a word, error signals propagate more directly into the attention context.

TABLE 3

Effect of decoder dimension on the model's performance. The performance of cold fusion models degrades more slowly as the decoder size decreases. This corroborates the fact that the decoder only needs to learn the task not label generation. Its effective task capacity is much larger than without fusion.

| Model | Decoder size | Source | |
|---|---|---|---|
| | | CER | WER |
| Attention | 64 | 16.33% | 33.98% |
| | 128 | 11.14% | 24.35% |
| | 256 | 8.89% | 18.74% |
| | 960 | 7.54% | 14.68% |
| Cold Fusion | 64 | 9.47% | 17.42% |
| | 128 | 7.96% | 15.15% |
| | 256 | 6.71% | 13.19% |
| | 960 | 5.82% | 11.52% |

6. Embodiments of Fine-Tuning for Domain Adaptation

In the presence of limited data from the target distribution, fine tuning a model for domain transfer is often a promising approach. In this patent document, various tests have been done on how much labeled data from the target distribution is preferably used for Cold Fusion models to effectively close the domain adaptation gap.

In embodiments, the same language model from Section D.4 trained on both the source and target domains was used for all fine-tuning experiments. The learning rate was restored to its initial value. Then, only the fusion mechanism of the best Cold Fusion model from Table 2 were fine-tuned on various amounts of the labeled target dataset.

Results are presented in Table 4. With just 0.6% of labeled data, the domain gap decreases from 38.2% to 21.3%. With less than 10% of the data, this gap is down to only 8%. It should be noted that because the Seq2Seq parameters are kept fixed during the fine-tuning stage, all of the improvements from fine-tuning come from combining the acoustic and the language model better. It's possible that bigger gains may be obtained by fine-tuning all the parameters, which has not been done in implemented experiments because of the current focus in studying the effects of language model fusion in the Seq2Seq decoder.

TABLE 4

Results for fine-tuning the acoustic model (final row from Table 2) on subsets of the target training data.

| Model | Target Data | Target CER | WER | Domain Gap |
|---|---|---|---|---|
| Cold Fusion | 0% | 13.72% | 27.50% | 38.17% |
| Cold Fusion + | 0.6% | 11.98% | 23.13% | 21.30% |
| Fine-tuning | 1.2% | 11.62% | 22.40% | 18.49% |
|  | 2.4% | 10.79% | 21.05% | 13.28% |
|  | 4.8% | 10.46% | 20.46% | 11.00% |
|  | 9.5% | 10.11% | 19.68% | 7.99% |
| Attention* | 100% | 8.84% | 17.61% | 0.00% |

*The final row represents an attention model that was trained on all of the target domain data.

Some examples are presented in Table 5. It should be noted that all models are trained on the source domain consisting of the read speech of search queries and evaluated on the read speech of movie scripts to measure out-of-domain performance. Because search queries tend to be sentence fragments, it was observed that the main mode of error for vanilla attention and Deep Fusion is due to weak grammar knowledge. Cold Fusion embodiments on the other hand demonstrate a better grasp of grammar and are able to complete sentences.

TABLE 5

Some examples of predictions by the Deep Fusion and Cold Fusion models

|  | Prediction |
|---|---|
| Ground Truth | where's the sport in that greer snorts and leaps greer hits the dirt hard and rolls |
| Plain Seq2Seq | where is the sport and that through snorks and leaps clear its the dirt card and rules |
| Deep Fusion | where is the sport and that there is north some beliefs through its the dirt card and rules |
| Cold Fusion | where's the sport in that greer snorts and leaps greer hits the dirt hard and rolls |
| Cold Fusion (Fine-tuned) | where's the sport in that greer snorts and leaps greer hits the dirt hard and rolls |
| Ground Truth | jack sniffs the air and speaks in a low voice |
| Plain Seq2Seq | jacksonice the air and speech in a logos |
| Deep Fusion | jacksonice the air and speech in a logos |
| Cold Fusion | jack sniffs the air and speaks in a low voice |
| Cold Fusion (Fine-tuned) | jack sniffs the air and speaks in a low voice |
| Ground Truth | skipper leads her to the dance floor he hesitates looking deeply into her eyes |
| Plain Seq2Seq | skip er leadure to the dance floor he is it takes looking deeply into her eyes |
| Deep Fusion | skip er leadure to the dance floor he has it takes looking deeply into her eyes |
| Cold Fusion | skipper leads you to the dance floor he has a tates looking deeply into her eyes |
| Cold Fusion (Fine-tuned) | skipper leads her to the dance floor he hesitates looking deeply into her eyes |

E. Some Conclusions

In this patent document, embodiments a new general Seq2Seq model (Cold Fusion) architecture were presented. In embodiments of the architecture, the decoder was trained together with a pre-trained language model. Architectural changes for the model that facilitated leveraging of information from the language model were studied and identified. By leveraging the RNN language model, Cold Fusion model embodiments reduced word error rates by up to 18% compared to Deep Fusion. Additionally, it was shown that Cold Fusion models may transfer more easily to new domains, and with only 10% of labeled data nearly fully transfer to the new domain.

F. System Embodiments

In embodiments, aspects of the present patent document may be directed to, may include, or may be implemented on one or more information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be or may include a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
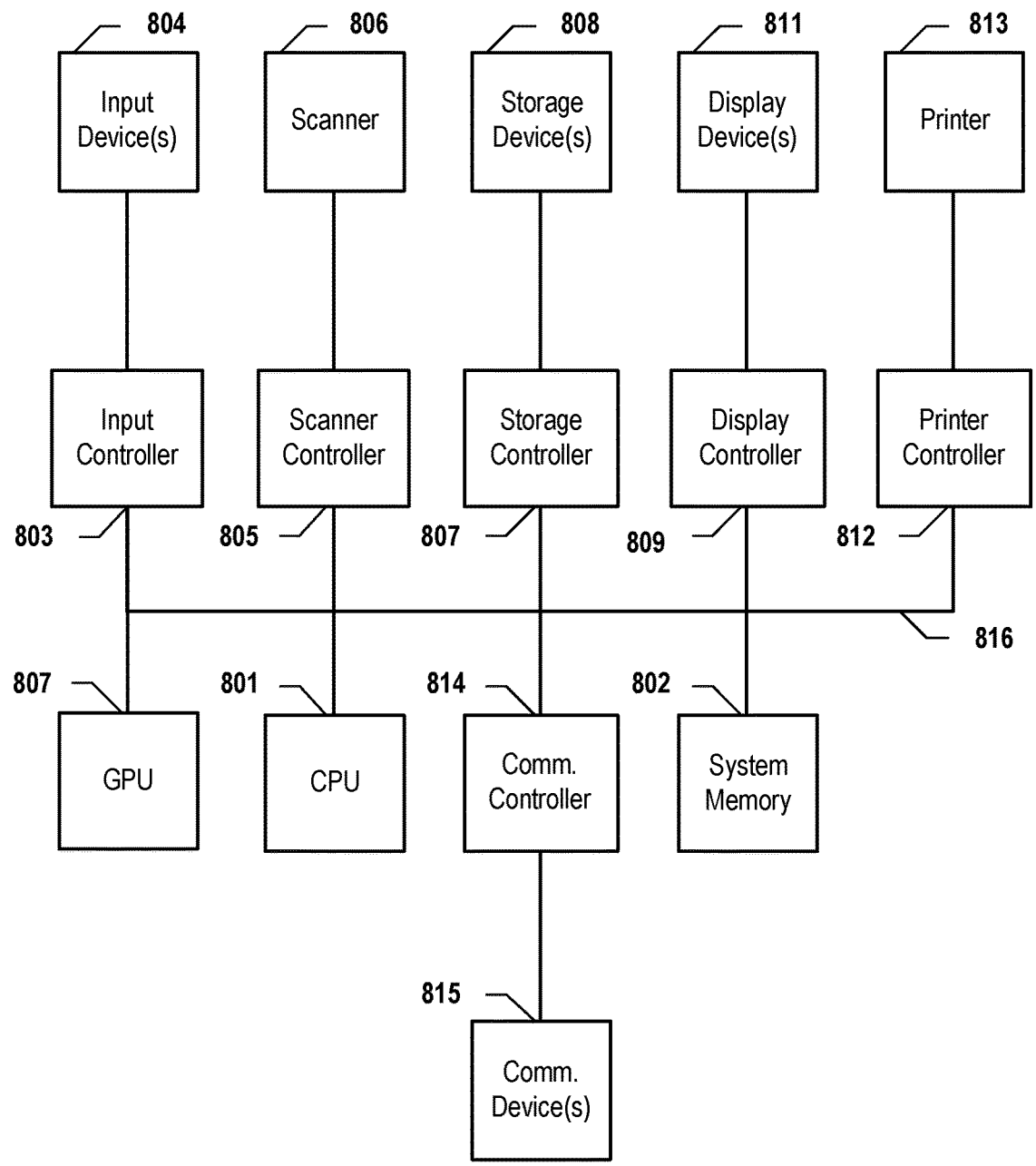
FIG. 8 depicts a simplified block diagram of a computing device/information handling system, according to embodiments of the present disclosure.

FIG. 8 depicts a simplified block diagram of a computing device/information handling system (or computing system) according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 817 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system may include a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include a printer controller 812 for communicating with a printer 813. A communications controller 814 may interface with one or more communication devices 815, which enables system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently, including having multiple dependencies, configurations, and combinations.

What is claimed is:

1. A computer-implemented method for training a sequential-to-sequential (Seq2Seq) model, the method comprising:
   pre-training a language model (LM) with a set of training data to obtain a pre-trained language model;
   obtaining a hidden state of the Seq2Seq model based on an input sequence, in which the Seq2Seq model has not been pre-trained;
   combining a gated LM hidden state, which is generated using a LM hidden state obtained using an output of the pre-trained language model and a gate, with the hidden state obtained from the Seq2Seq model to form a combined hidden state; and
   using an output, which is obtained using a deep neural network (DNN) that takes as an input the combined hidden state, to train the Seq2Seq model.

2. The computer-implemented method of claim 1 wherein the set of training data are unlabeled training data.

3. The computer-implemented method of claim 1 wherein the language model was trained in at least one of a source domain and a target domain of the Seq2Seq model.

4. The computer-implemented method of claim 1 wherein the gate comprises the LM hidden state obtained using the output from the pre-trained language model and the hidden state from the Seq2Seq model as input.

5. The computer-implemented method of claim 4 wherein the LM hidden state obtained using the output from the pre-trained language model is an output of a deep neural network (DNN), which takes as input a logit output of the pre-trained language model and outputs the LM hidden state.

6. The computer-implemented method of claim 1 wherein the deep neural network (DNN) comprises an affine layer and activation.

7. The computer-implemented method of claim 6 wherein the output of the DNN is fed into a softmax to generate the output used for the Seq2Seq model training.

8. A computer-implemented method for training a sequential-to-sequential (Seq2Seq) model that has not been pre-trained with a language model (LM) that has been pre-trained, the method comprising:
   receiving, at an encoder of the Seq2Seq model, which has not been pretrained, an input sequence;
   generating, by the encoder, an intermediate representation of the input sequence;
   receiving, with at least one recurrent layer within a decoder of the Seq2Seq model, the intermediate representation;
   generating, by the least one recurrent layer, a hidden state of the Seq2Seq model based at least on the intermediate representation;
   combining the hidden state from the Seq2Seq model with a gated LM hidden state, which is generated using a gate and a LM hidden state obtained using an output from the language model that has been pretrained, into a combined hidden state; and
   generating an output using a deep neural network (DNN) that takes as an input the combined hidden state.

9. The computer-implemented method of claim 8 wherein the at least one recurrent layer within the decoder of the Seq2Seq model is gated recurrent unit (GRU) layer.

10. The computer-implemented method of claim 8 further comprises fine-tuning the Seq2Seq model with new data in a different domain.

11. The computer-implemented method of claim 8 wherein the encoder comprises one or more recurrent layers to generate the intermediate representation.

12. The computer-implemented method of claim 8 wherein the output of the language model is the LM hidden state, which represents an output hidden state of the language model.

13. The computer-implemented method of claim 11 wherein the encoder further comprises at least one max pooling layer coupled between the one or more recurrent layers.

14. The computer-implemented method of claim 8 wherein the gate uses the hidden state from the Seq2Seq model and the LM hidden state obtained using the output from the language model as inputs.

15. The computer-implemented method of claim 8 wherein the LM hidden state is an output of a deep neural network (DNN) that receives as input a logit output of the language model and outputs the LM hidden state.

16. The computer-implemented method of claim 8 wherein the gated LM hidden state and the hidden state from the Seq2Seq model are concatenated to generate the combined hidden state.

17. The computer-implemented method of claim 8 wherein the deep neural network (DNN) comprises an affine layer and activation.

18. The computer-implemented method of claim 15 wherein the DNN further comprises an affine layer prior to a softmax, the affine layer integrated with rectified linear unit (ReLU) activation.

19. A computer-implemented method for training a sequential-to-sequential (Seq2Seq) model, the method comprising:
   inputting an input sequence into the Seq2Seq model, which has not been pretrained;
   generating a hidden state of the Seq2Seq model;
   obtaining a combined hidden state based at least on the generated hidden state of the Seq2Seq model and a gated probability projection, which is generated using a gate and an output of a language model that has been pretrained; and
   using an output, which is obtained using a deep neural network (DNN) that takes as an input the combined hidden state, to train the Seq2Seq model.

20. The computer-implemented method of claim 19 wherein the probability projection comprises projecting a token distribution onto a common embedding space.

* * * * *